United States Patent
Lind

(10) Patent No.: US 6,761,003 B2
(45) Date of Patent: Jul. 13, 2004

(54) FIXING DEVICE FOR THE FIXING OF SHEET MATERIAL TO A SUB-STRUCTURE

(75) Inventor: Stefan Lind, Waldachtal (DE)

(73) Assignee: Fischerwerke Artur Fischer GmbH & Co. KG, Waldachtal (DE)

(*) Notice: Subject to any disclaimer, the term of this patent is extended or adjusted under 35 U.S.C. 154(b) by 38 days.

(21) Appl. No.: 10/168,220

(22) PCT Filed: Feb. 14, 2001

(86) PCT No.: PCT/EP01/01615

§ 371 (c)(1),
(2), (4) Date: Jun. 19, 2002

(87) PCT Pub. No.: WO01/65045

PCT Pub. Date: Sep. 7, 2001

(65) Prior Publication Data

US 2002/0189178 A1 Dec. 19, 2002

(30) Foreign Application Priority Data

Feb. 29, 2000 (DE) .......................... 100 09 531

(51) Int. Cl.[7] .............................................. E04H 1/00
(52) U.S. Cl. ........................................ 52/235; 403/293
(58) Field of Search ............................ 52/235, 582.1, 52/587.1, 395, 402; 403/293, 294

(56) References Cited

U.S. PATENT DOCUMENTS 5,417,050 A * 5/1995 Cosentino ................. 52/506.08
5,425,208 A * 6/1995 Eekhout ..................... 52/235

FOREIGN PATENT DOCUMENTS

| DE | 198 39 419 A1 | 3/2000 |
| EP | 0 595 317 A | 5/1994 |
| JP | 9-111931 | 4/1997 |
| JP | 9-111934 | 4/1997 |

* cited by examiner

Primary Examiner—Carl D. Friedman
Assistant Examiner—Naoko Slack
(74) Attorney, Agent, or Firm—Michael J. STriker

(57) ABSTRACT

The invention relates to a retaining means (10) for fixing panel-form material, for example, glass panes (12) of a glass facing, to a substructure (14). The invention proposes constructing the retaining means (10) with a support (16), in which supporting elements (22) projecting pivotally to the side are insertable, to which the glass panes (121) can be displaceably fixed. The invention has the advantage that in a simple and inexpensive manner it permits stress-free fixing of glass panes (12) so that thermal expansion is compensated.

10 Claims, 2 Drawing Sheets

FIXING DEVICE FOR THE FIXING OF SHEET MATERIAL TO A SUB-STRUCTURE

BACKGROUND OF THE INVENTION

The invention relates to a retaining means for fixing panel-form material to a substructure. The retaining means is intended in particular for fixing glass panes of a glass facing to a construction comprising cross-members and posts. Solar panels, for example, can also be fixed to a wall or to a roof therewith.

When fixing glass panes to a glass facing, the problem arises that the fixing ought to be able to compensate for manufacturing tolerances in order to be able to fix the glass panes so that they are not under stress. The fixing should also be capable of compensating without stress for changes in the size of the glass panes in relation to the substructure, such changes possibly being caused by changes in temperature. At the same time, the fixing should hold the glass pane at its intended positions. Furthermore, the fixing should be inexpensive to manufacture and capable of being mounted with little effort. A further requirement is the appearance of the fixing; it should detract from the visual impression of the glass facing as little as possible.

The invention is based on the problem of providing a retaining means for fixing panel-form material, especially glass panes of a glass facing, which satisfies the above requirements.

SUMMARY OF THE INVENTION

That problem is solved in accordance with the present invention. The retaining means according to the invention comprises a support fastenable to a substructure, for example a construction comprising posts and cross-members. Fixing of the support can be effected by screwing the support to a post of the post/cross-member construction. The support forms a base part of the retaining means according to the invention. A supporting element is fastened to the support so as to be movable in a plane parallel to the plane of the panel-form material, for example, the glass panes. The panel-form material is fastened to the supporting element. The mobility of the supporting element in the plane of the panel-form material enables both manufacturing tolerances and thermal expansion of the panel-form material in relation to the substructure to be compensated. The invention has the advantage that it permits stress-free mounting of panel-form material on a substructure and compensates for manufacturing inaccuracies.

For the purpose of fastening the supporting element to the support so that the former is movable in the plane of the panel-form material, a construction of the invention provides for a pivot-mounting of the supporting element on the support. The pivot-mounting enables the mobility of the supporting element in the plane of the panel-form material to be achieved in a simple and inexpensive way.

In a preferred construction, the fixing of the supporting element to the support is releasable, in order to be able to exchange the supporting element.

In order to stabilise the position of the support on the substructure, in a construction of the invention the support comprises a connecting device, with which the support is fastenable to the substructure by form fit locked against rotation. The connecting device can be, for example, a groove of the width of a post of the cross-member/post construction, in which a post of the substructure lies. The fastening of the support to the substructure locked against rotation is especially important when the support is fastened, for example, by a screw to the substructure. The form fit means that the support is independent of the tightening moment of the screw and is permanently secured against twisting even when under load.

In a development of the invention, the retaining means comprises several supporting elements for fixing, for example, several glass panes. For example, the device comprises four supporting elements, which are arranged in the form of a star on the support. With this device, four glass panes can be fastened at their edges facing one another. To fix two glass panes at their adjacent side edges, two of the four supporting elements are removed and the two glass panes are fixed to the two opposite supporting elements remaining.

To form a fixed point, in a construction of the invention a locating device is provided, with which the supporting element is fixable. In this way, it is possible, for example, to fix a glass pane immovably at one point, for example, at a corner and hence to position it (fixed bearing). The remaining fixing points of the glass pane are movably fixed (movable bearing) with further devices according to the invention, in order to obtain the desired facility for compensating for manufacturing tolerances and thermal expansion. The locating device can be of adjustable construction for positioning the glass pane.

A further construction of the invention provides a guide, especially a sliding guide for fixing the panel-form material to the supporting element of the retaining means according to the invention. This guide also serves for compensation of manufacturing tolerances and thermal expansion.

In a preferred construction of the invention, the support is of constant cross-section over its thickness and/or the supporting element has a constant longitudinal section over its width. The purpose of this construction of the invention is to be able to cut the support and/or the supporting element from a, for example, extruded profiled rod. This enables the support and/or the supporting element to be inexpensively manufactured. A constant cross-section and longitudinal section respectively shall be understood to mean that the support and the supporting element respectively are constructed to be cut from a profiled rod, that is, the support or the supporting element in one direction has a cross-section that is constant in respect of shape and size, regardless of whether the transverse or longitudinal section is actually concerned.

BRIEF DESCRIPTION OF THE DRAWINGS

The invention is explained in detail hereinafter with reference to an exemplary embodiment illustrated in the drawings, in which.

DETAILED DESCRIPTION OF THE PREFERRED EMBODIMENTS

Figure 1:
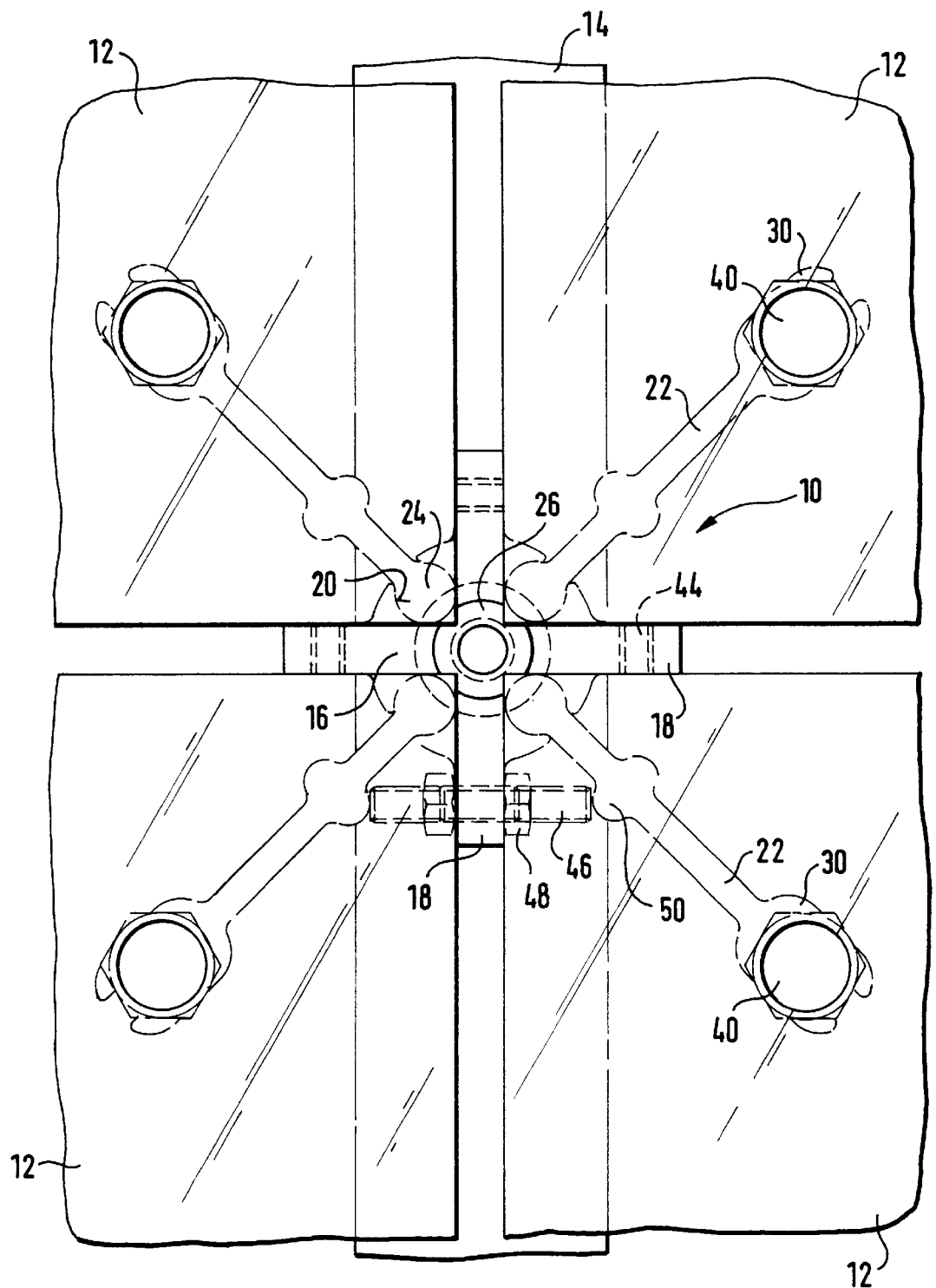
FIG. 1 shows a front view of a retaining means according to the invention.

The retaining means 10 according to the invention illustrated in FIG. 1 is intended for fixing panel-form material 12 to a substructure 14. In the illustrated embodiment, glass panes 12 of a glass facing are fixed with the retaining means 10 to a post 14 of a substructure, the remainder of which is not shown, consisting of (vertical) posts 14 and (horizontal) cross-members. The retaining means 10 comprises as base part a star-shaped support 16 (compare also FIG. 3), having four outwardly extending supporting ribs 18 arranged at right angles to one another. On notional bisecting lines between the supporting ribs 18 the support 16 has outwardly open grooves 20 of circular cross-section, which form pivot bearing sockets 20. The support 16 has a constant cross-section over its entire thickness, corresponding to the end face illustrated in FIGS. 1 and 3. Thickness here means the extent of the support 16 perpendicular to the plane of drawing in FIG. 1. The constant cross-section enables the support 16 to be manufactured by cutting from an extruded profiled rod of aluminium. In this way, the support 16 can be manufactured inexpensively.

Supporting elements 22 are inserted in the pivot bearing socket 20 of the support 16. The supporting elements 22 are in the form of flat bars having at their inner ends an enlargement 24 of circular cross-section complementary to the pivot bearing sockets 20. The enlargement 24 forms a pivot bearing shaft 24, with which the supporting elements 22 are located pivotally in the pivot bearing sockets 20 of the support 16. The supporting elements 22 project outwardly from the support 16 in the form of a star at angles of approximately 90° with respect to one another. The supporting elements 22 are pivotable in the plane of the glass panes 12.

The supporting elements 22 are inserted into the support 16 by sliding the supporting elements 22 with their pivot bearing shafts 24 longitudinally into the pivot bearing sockets 20 of the support 16. The supporting elements 22 are secured by means of a central collar nut 26, the circumferential collar of which engages in slots 28 in the pivot bearing shafts 24 of the supporting elements 22 (see FIG. 2; in FIG. 2, the supporting element 22 on the right in the drawing has been omitted for clarity). At their outer ends, the supporting elements 22 have a fork 30 with a longitudinal slot 32 (FIG. 3).

Figure 2:
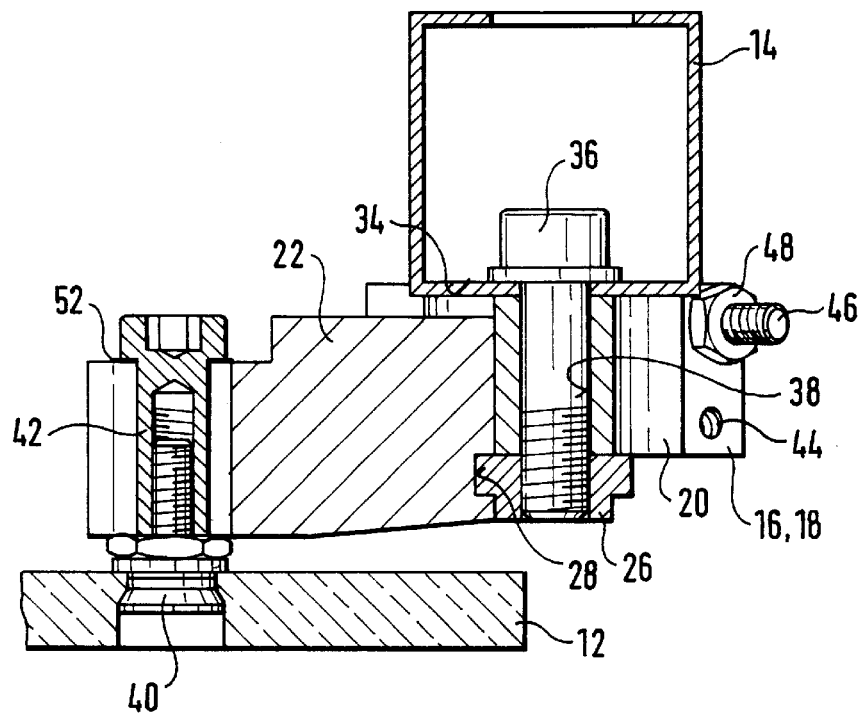
FIG. 2 is a sectional view of the retaining means of FIG. 1 along the line II—II in FIG. 3.
Figure 3:
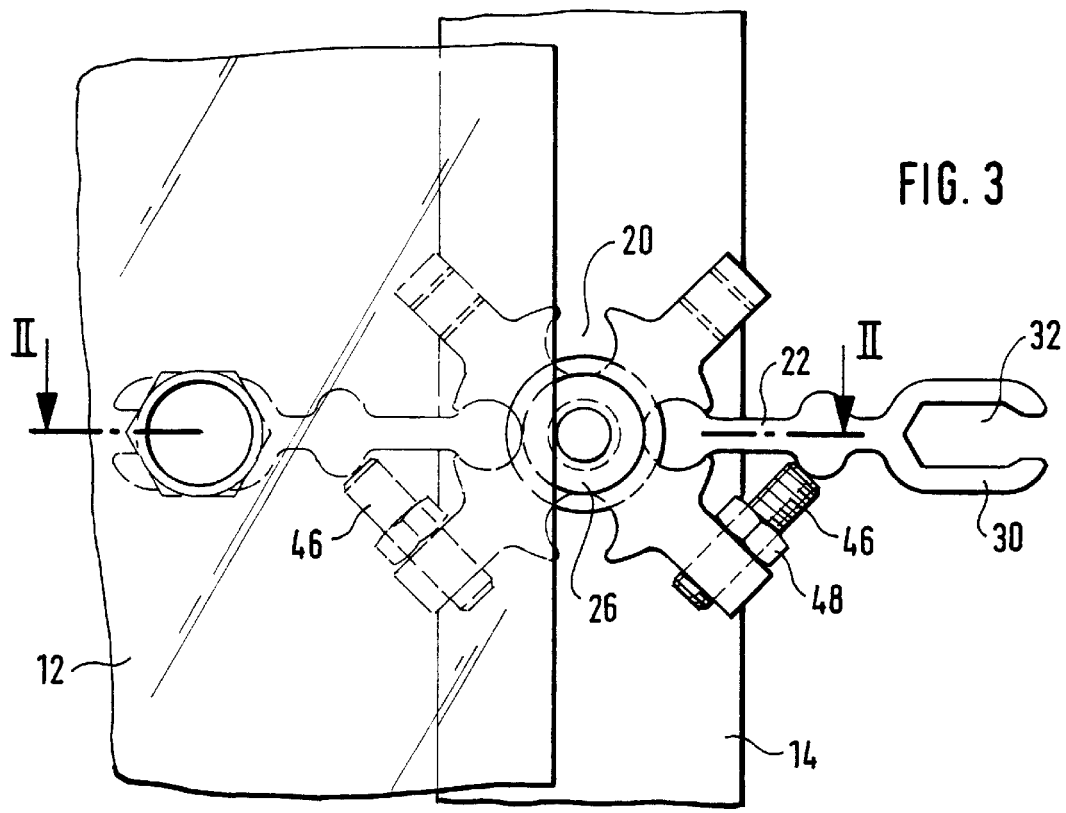
FIG. 3 is a further illustration of the retaining means of FIG. 1 in front view.

For fixing, locked against rotation, to the post 14, the support 16 of the retaining means 10 according to the invention has on its rear side facing the post 14 a flat, rectangular groove or rebate 34, the width of which corresponds to the width of the post (FIG. 2). The rebate 34 forms a connecting device 34, in which the post 14 is located. In this way, the support 16 is held on the post 14 by form fit locked against rotation. Fixing of the support 16 is effected by means of a central bolt 36, which is pushed through the post 14 and a central hole 38 in the support 16 and screwed into the collar nut 26.

The supporting elements 22 in the form of flat bars have a constant longitudinal section across their width, which corresponds to the side face of the supporting elements 22 visible in FIG. 1. In this way, the supporting elements 22 can also be inexpensively manufactured by cutting from an extruded profiled rod of an aluminium alloy.

In FIG. 1, four glass panes 12 are secured in the region of corners facing one another of the glass panes 12 by means of the retaining means 10 according to the invention to the post 14 of the substructure, the remainder of which is not shown. For fixing, the glass panes 12 are provided with an undercut bore, in which an undercut glass anchor 40 is inserted. Since such undercut glass anchors 40 are known per se to the expert and do not form the actual subject matter of the invention, they are not described in detail. The undercut glass anchors 40 lie with a shank 42 in the longitudinal slots 32 of the forks 30 of the supporting elements 22. In FIG. 3, the right-hand glass pane, including its undercut glass anchor, has been omitted for clarity, so that the fork 30 of the supporting element 22 is visible. In FIG. 1, the two upper supporting elements 22 form releasable bearings of the retaining means 10 according to the invention. The undercut glass anchors 40 of the two upper glass panes 12 in FIG. 1 are located slidably in the longitudinal slot 32 of the forks 30; the longitudinal slot 32 forms a sliding guide for the glass panes 12, with which the glass panes 12 are held so as to be slidable in the longitudinal direction of the supporting elements 22. The additional pivotability of the two supporting elements 22 at the top in FIG. 1 ensures that the two glass panes 12 at the top in FIG. 1 are displaceable in all directions in the plane of the glass panes 12. This mobility enables manufacturing tolerances and thermal expansion of the glass panes 12 in relation to the posts 14 to be compensated. The two supporting elements 22 at the top in FIG. 1 form releasable bearings for the glass panes 12.

The supporting elements 22 can also be in the form of fixed bearings, which is shown at the bottom of FIG. 1. To form individual supporting elements 22 as fixed bearings, two threaded holes 44 are made laterally side by side in each of the supporting ribs 18 of the support 16. To form the two supporting elements 22 at the bottom in FIG. 1 as fixed bearings, two grub screws 46 are screwed into the downwardly directed supporting rib 18 of the support 16 and secured with screwed-down nuts 48. The grub screws 46 project in opposite directions horizontally from the supporting rib 18. The grub screws 46 support the supporting elements 22, the supporting elements 22 having spaced from their pivot bearing shafts 24 protuberances 50 extending to each side, with which the supporting elements 22 abut the grub screws 46. The grub screws 46 form locating devices for the supporting elements 22, with which the angular position of the supporting elements 22 can be fixed.

To construct the fixed bearings, the undercut glass anchors 40 of the two lower glass panes in FIG. 1 are fixedly clamped in the forks 30 of the supporting elements 22. A washer 52 (FIG. 2) is inserted between the undercut glass anchors 40 and the forks 30 for the clamping. The two lower supporting elements 22 in FIG. 1 therefore form fixed bearings, by which the glass panes 12 secured to them are fixed at their corners. Before the undercut glass anchors 40 are tightened, the undercut glass anchors 40 are displaceable in the forks 30 of the supporting elements 22. By turning the grub screws 46, the angle at which the supporting elements 22 extend from the support 16 is adjustable. In this way, the point at which the corners of the lower glass panes 12 in FIG. 1 are fixed is adjustable, and the glass panes 12 can be positioned on the substructure comprising the posts 14.

To fix two glass panes 12 to a post 14 in the region of adjacent edges of the glass panes 12, the support 16 of the retaining means 10 according to the invention is preferably mounted with horizontally projecting supporting elements 22 on the post 14, as illustrated in FIG. 3. The support 16 is therefore screwed down to the post 14 in a position rotated through 45° with respect to FIG. 1; the counter-sinking 34 forming the connecting device 34 is aligned correspondingly. Only two supporting elements 22 projecting to the side are inserted in the support 16. The same retaining means 10 can therefore be used either for corner or for edge fixing of glass panes 12 to a post 14. Fixing of just one glass pane 12 is also possible, only one supporting element 22 then being inserted in the support 16. Also in FIG. 3, the supporting elements 22 can be constructed as fixed bearings, as shown, by being supported by the grub screws 46, or as releasable bearings by omitting or unscrewing the grub screws 46.

What is claimed is:

1. Retaining means for fixing panel-form material to a substructure, comprising, a support (16) that is fixable to the substructure (14), wherein the retaining means (10) comprises a supporting element (22) fixed to the support (16) so as to be movable in a plane parallel to a plane of the panel-form material (12) and to which the panel-form material (12) is fixed, wherein the supporting element (22) comprises a guide (32) with which the panel-form material (12) is fixable to the supporting element (22) so as to be movable in a plane of the panel-form material (12), and wherein the guide (32) is a sliding guide.

2. The retaining means according to claim 1, wherein the supporting element (22) is pivotally fixed to the support (16).

3. The retaining means according to claim 1, wherein the supporting element (22) is releasably fixed to the support (16).

4. The retaining means according to claim 1, wherein the support (16) comprises a connecting device (34) with which the support (16) is fixable by form fit locked against rotation to the substructure (14).

5. The retaining means according to claim 1, wherein the retaining means (10) comprises several supporting elements (22).

6. The retaining means according to claim 5, wherein the retaining means (10) comprises up to four supporting elements (22), wherein the supporting elements (22) are arranged in the form of a star on the support (16).

7. The retaining means according to claim 1, wherein the retaining means (10) comprises a locating device (46) with which the supporting element (22) is locatable on the support (16).

8. The retaining means according to claim 1, wherein the support (16) has a constant cross-section over its thickness.

9. The retaining means according to claim 1, wherein the supporting element (22) has a constant longitudinal section over its width.

10. Retaining means for fixing panel-form material to a substructure, comprising a support (16) that is fixable to the substructure (14), wherein the retaining means (10) comprises a supporting element (22) fixed to the support (16) so as to be movable in a plane parallel to a plane of the panel-form material (12) and to which the panel-form material (12) is fixed, wherein the retaining means (10) comprises a screw (46) with which the Supporting element (22) is locatable on the support (16).

* * * * *